United States Patent
Xu et al.

(10) Patent No.: US 10,142,060 B2
(45) Date of Patent: Nov. 27, 2018

(54) COMMUNICATION SYSTEM AND METHOD HAVING POLAR CODING WITH TWO CONCATENATED CYCLIC REDUNDANCY CHECK CODES

(71) Applicant: QUALCOMM INCORPORATED, San Diego, CA (US)

(72) Inventors: Changlong Xu, Beijing (CN); Jing Jiang, San Diego, CA (US); Yang Yang, San Diego, CA (US); Gabi Sarkis, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/905,243

(22) Filed: Feb. 26, 2018

(65) Prior Publication Data

US 2018/0287738 A1 Oct. 4, 2018

Related U.S. Application Data

(63) Continuation of application No. PCT/CN2017/079325, filed on Apr. 1, 2017.

(51) Int. Cl.
*H03M 13/00* (2006.01)
*H04L 1/00* (2006.01)

(52) U.S. Cl.
CPC .......... *H04L 1/0064* (2013.01); *H04L 1/0041* (2013.01); *H04L 1/0045* (2013.01)

(58) Field of Classification Search
CPC .... H04L 1/0064; H04L 1/0041; H04L 1/0045
See application file for complete search history.

(56) References Cited

U.S. PATENT DOCUMENTS

| | | | |
|---|---|---|---|
| 6,357,031 B1 * | 3/2002 | Lee | G11B 20/1833 714/758 |
| 2014/0173376 A1 | 6/2014 | Jeong et al. | |
| 2016/0013810 A1 * | 1/2016 | Gross | H03M 13/09 714/776 |
| 2016/0079999 A1 | 3/2016 | Shen et al. | |

(Continued)

FOREIGN PATENT DOCUMENTS

| | | |
|---|---|---|
| CN | 103220001 A | 7/2013 |
| CN | 105227189 A | 1/2016 |

(Continued)

OTHER PUBLICATIONS

International Search Report and Written Opinion—PCT/CN2017/079325—ISA/EPO—dated Jan. 4, 2018.

(Continued)

*Primary Examiner* — Guy J Lamarre
(74) *Attorney, Agent, or Firm* — Qualcomm IP Dept.; James Hunt Yancey, Jr.

(57) ABSTRACT

Polar encoding using two or more concatenated cyclic redundancy check (CRC) data values may enhance CRC-aided successive cancellation list decoding in a communication system. A polar encoding method may include determining first CRC data from source data, combining the source data and the first CRC data to form first combined data, determining second CRC data from the first combined data, and combining the source data, the first CRC data, and the second CRC data to form second combined data.

18 Claims, 14 Drawing Sheets

(56) References Cited

U.S. PATENT DOCUMENTS

| | | | |
|---|---|---|---|
| 2017/0003889 A1* | 1/2017 | Kim | G06F 3/0611 |
| 2017/0039098 A1* | 2/2017 | Alhussien | G06F 11/1068 |
| 2017/0214416 A1* | 7/2017 | Ge | H03M 13/2927 |
| 2017/0366199 A1* | 12/2017 | Ge | G06F 11/1479 |

FOREIGN PATENT DOCUMENTS

| | | |
|---|---|---|
| CN | 105337696 A | 2/2016 |
| EP | 2802080 A1 | 11/2014 |
| EP | 2899911 A1 | 7/2015 |
| WO | 2013107140 A1 | 7/2013 |
| WO | 2014071658 A1 | 5/2014 |

OTHER PUBLICATIONS

Intel Corporation: "Polar Code Design", R1-1700386, 3GPP TSG RAN WG1 Ad hoc, Jan. 20, 2017, 12 pages.

Yu Q., et al., "Hybrid Parity-Check and CRC Aided SCL Decoding for Polar codes", 2016 IEEE International Conference on Internet of Things (iThings) and IEEE Green Computing and Communications (GreenCom) and IEEE Cyber, Physical and Social Computing (CPSCom) and IEEE Smart Data (SmartData), Dec. 31, 2016, pp. 711-716.

Tal et al., "List Decoding of Polar Codes", Proceedings of the 2011 IEEE Transactions on Information Theory, Jul. 2011, pp. 1-11.

International Search Report and Written Opinion—PCT/CN2018/081416—ISA/CN—dated Jun. 6, 2018.

* cited by examiner

COMMUNICATION SYSTEM AND METHOD HAVING POLAR CODING WITH TWO CONCATENATED CYCLIC REDUNDANCY CHECK CODES

This is a continuation of co-pending International Application PCT/CN2017/079325, with an international filing date of Apr. 1, 2017, the benefit of which is hereby claimed under 35 U.S.C. § 120.

TECHNICAL FIELD

The present disclosure relates to wireless communication systems, and more particularly to encoding and decoding information.

INTRODUCTION

Improvements in channel coding, specifically forward error correction (FEC) codes, have contributed significantly to the development of increasingly higher data-rate communication systems, from 2G to 3G, then to 4G, and more recently to 5G, as such technologies are commonly known. Polar codes form a class of FEC codes that is proving to be advantageous. In polar coding, a representation of a physical channel is copied and transformed into N sub-channels, where the number N is the block length of the polar code. Each sub-channel has an associated reliability. That is, as N approaches infinity, each sub-channel is characterized as either increasingly noisy or decreasingly noisy. The term "reliability" relates to resistance of a channel to adverse effects of noise. Reliability is thus inversely related to noisiness. As generating a polar code enables a priori knowledge of the reliability of each sub-channel, the K most reliable sub-channels can be used to transmit information, while the N-K remaining sub-channels are "frozen" or set to a predetermined bit value known to both the transmitter and receiver.

A method known as successive cancellation list (SCL) decoding may be used in decoding polar codes. In SCL decoding, the number of decoding paths in a tree structure is doubled at each decoding stage, and the paths are added to a list. Each decoding stage represents a decision of either 0 or 1 at a node of the tree. A pruning method is used at each stage to discard all but the most reliable or "best" paths. Performance of SCL decoding may be improved by employing concatenated coding, in which a cyclic redundancy check (CRC) code is added to the information before polar encoding. Such a concatenating coding method may be referred to as CRC-aided SCL (CA-SCL).

BRIEF SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the disclosure provides a method for communication. Such an exemplary method may include determining first cyclic redundancy check (CRC) data from source data, combining the source data and the first CRC data to form first combined data, determining second cyclic redundancy check (CRC) data from the first combined data, combining the source data, the first CRC data, and the second CRC data to form second combined data, polar encoding the second combined data to form output data, and transmitting the output data over a channel.

Another aspect of the disclosure provides an apparatus for communication. Such an exemplary apparatus may include baseband circuitry for providing source data, and a processing system comprising a processor and memory. The processing system may be configured to determine first CRC data from source data. The processing system may be configured to combine the source data and the first CRC data to form first combined data. The processing system may further be configured to determine second CRC data from the first combined data. The processing system may be still further configured to combine the source data, the first CRC data, and the second CRC data to form second combined data. The processing system may be configured to polar encode the second combined data to form output data. The processing system may be configured to control transmission of the output data over a channel.

Another aspect of the disclosure provides a non-transitory computer-readable medium storing computer executable code for controlling communication. The code is executable by a processor to control a method that may include determining first CRC data from source data, combining the source data and the first CRC data to form first combined data, determining second CRC data from the first combined data, combining the source data, the first CRC data, and the second CRC data to form second combined data, polar encoding the second combined data to form output data, and transmitting the output data over a channel.

Another aspect of the disclosure provides another method for communication. Such an exemplary method may include receiving input data over a channel, and decoding the input data using a plurality of successive decoding stages. The input data represents a polar-encoded combination of source data, second. CRC data, and first CRC data. The second CRC data encodes a combination of the source data and concatenated first CRC data. The first CRC data encodes the source data. Decoding the input data may include, at each stage, generating exactly two duplicate decoding paths for each of L paths to provide a set of 2 L candidate paths, the two duplicate decoding paths representing respective decisions of 0 and 1, where L is an integer greater than 1. Decoding the input data may further include, at each stage, evaluating the set of 2 L candidate paths based on the source data to determine a set of L most reliable paths out of the set of 2 L candidate paths, and removing from further evaluation all but the set of L most reliable paths. The set of L most reliable paths is preserved for the next decoding stage.

Another aspect of the disclosure provides another apparatus for communication. Such an exemplary apparatus may include a processing system comprising a processor and memory configured to control reception of input data over a channel and to decode the input data using a plurality of successive decoding stages. The input data represents a polar-encoded combination of source data, second CRC data, and first CRC data. The second CRC data encodes a combination of the source data and concatenated first CRC data. The first CRC data encodes the source data. The exemplary apparatus may further include baseband circuitry for further processing the decoded data. The processing system may be configured decode the input data by, at each stage, being configured to generate exactly two duplicate decoding paths for each of L paths to provide a set of 2 L candidate paths, the two duplicate decoding paths representing respective decisions of 0 and 1, where L is an integer greater than 1. The processing system may further be configured to evaluate the set of 2 L candidate paths based on the source data to determine a set of L most reliable paths out of the set of 2 L candidate paths, and remove from further evaluation all but the set of L most reliable paths. The set of L most reliable paths is preserved for the next decoding stage.

Another aspect of the disclosure provides another non-transitory computer-readable medium storing computer executable code for controlling communication. The code is executable by a processor to control a method that may include receiving input data over a channel and decoding the input data using a plurality of successive decoding stages. The input data represents a polar-encoded combination of source data, second CRC data, and first CRC data. The second CRC data encodes a combination of the source data and concatenated first CRC data, the first CRC data encoding the source data. Decoding the input data may include, at each stage, generating exactly two duplicate decoding paths for each of L paths to provide a set of 2 L candidate paths, the two duplicate decoding paths representing respective decisions of 0 and 1, where L is an integer greater than 1. Decoding the input data may further include evaluating, the set of 2 L candidate paths based on the source data to determine a set of L most reliable paths out of the set of 2 L candidate paths, and removing from further evaluation all but the set of L most reliable paths. The set of L most reliable paths is preserved for the next decoding stage.

BRIEF DESCRIPTION OF THE DRAWINGS

In the figures, like reference numerals refer to like parts throughout the various views unless otherwise indicated. For reference numerals with letter character designations such as "102a" or "102b", the letter character designations may differentiate two like parts or elements present in the same figure. Letter character designations for reference numerals may be omitted when it is intended that a reference numeral encompass all parts having the same reference numeral in all figures.

DETAILED DESCRIPTION

Figure 1:
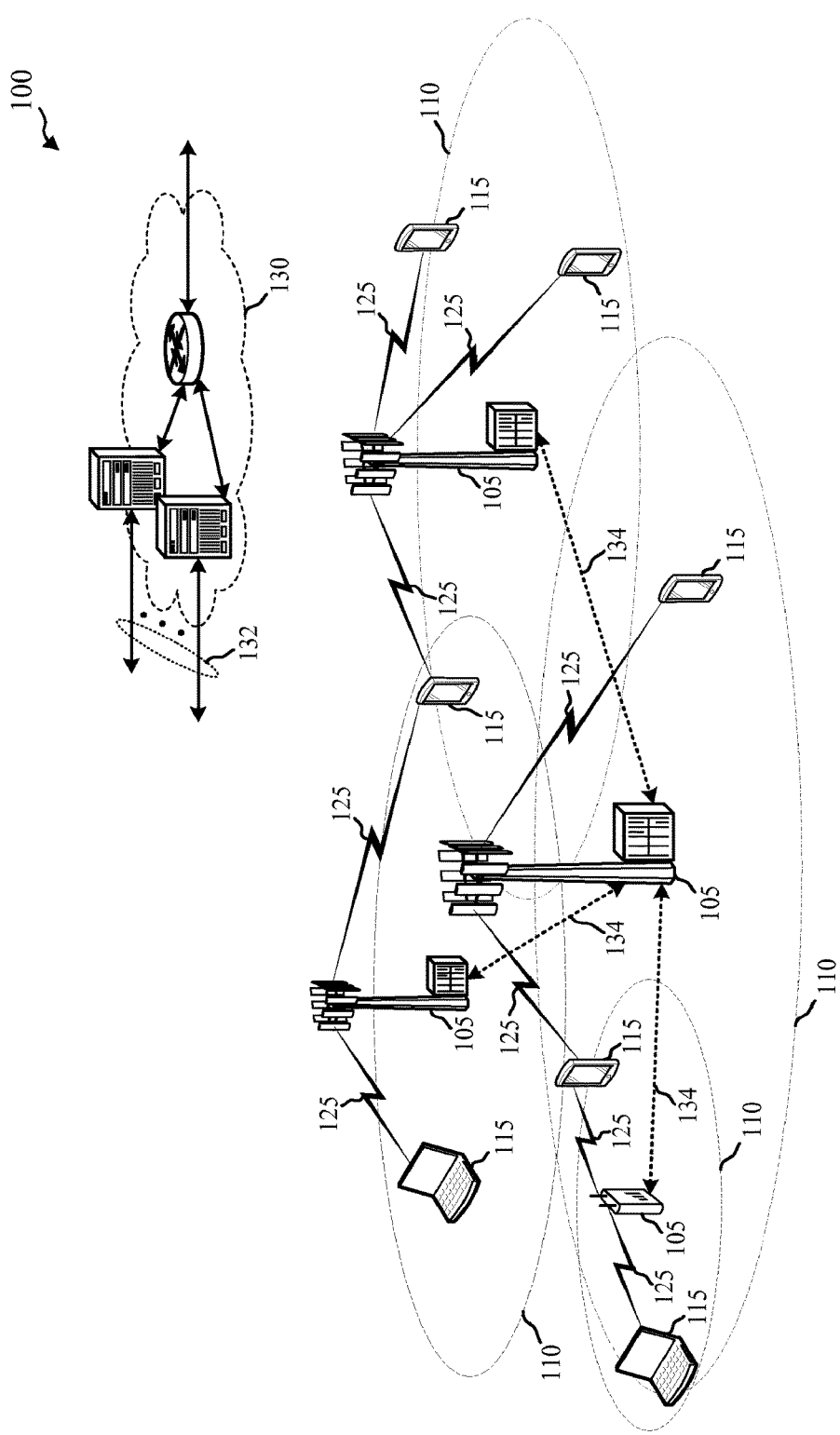
FIG. 1 is a network diagram illustrating an example of a communication network architecture, in accordance with various aspects of the present disclosure.

The word "exemplary" is used herein to mean "serving as an example, instance, or illustration." Any aspect described herein as "exemplary" is not necessarily to be construed as preferred or advantageous over other aspects.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, or any combination thereof. If implemented in software, the functions may be stored on or encoded as one or more instructions or code on a non-transitory computer-readable medium. Non-transitory computer-readable media include computer-readable storage media. Computer-readable storage media may be any available media that can be accessed by a computer or computer-based device. By way of example, and not limitation, such computer-readable storage media can comprise a random-access memory (RAM), a read-only memory (ROM), an electrically erasable programmable ROM (EEPROM), flash memory, optical disk storage, magnetic disk storage, other magnetic storage devices, combinations of the aforementioned types of computer-readable media, or any other medium that can be used to store computer executable code in the form of instructions or data structures that can be accessed by a computer or computer-based device.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 illustrates an example of a wireless communications system 100 in accordance with various aspects of the disclosure. The wireless communications system 100 includes base stations 105, UEs 115, and a core network 130. The core network 130 may provide user authentication, access authorization, tracking, Internet Protocol (IP) connectivity, and other access, routing, or mobility functions. The base stations 105 interface with the core network 130 through a first set of backhaul links 132 (e.g., Si, etc.) and may perform radio configuration and scheduling for communication with the UEs 115, or may operate under the control of a base station controller (not shown). In various examples, base stations 105 may communicate, either directly or indirectly (e.g., through core network 130), with each other over a second set of backhaul links 134 (e.g., X1, etc.), which may be wired or wireless communication links.

Each base station site may provide communication coverage for a respective geographic coverage area 110. In some examples, base stations 105 may be referred to as a base transceiver station, a radio base station, an access point, a radio transceiver, a NodeB, eNodeB (eNB), Home NodeB, a Home eNodeB, or some other suitable terminology. The geographic coverage area 110 for a base station 105 may be divided into sectors making up only a portion of the coverage area (not shown). Wireless communications system 100 may include base stations 105 of different types (e.g., macro and/or small cell base stations). There may be overlapping geographic coverage areas 110 for different technologies.

In some examples, wireless communications system 100 may be one or more of an LTE/LTE-A network and a 5G network. In LTE/LTE-A networks, the term evolved Node B (eNB), or in a 5G network, the term millimeter wave B (mWB) or gigabit Node B (gNB), may be used generally to describe base stations 105, while the term UE may be used generally to describe UEs 115. Wireless communications system 100 may be a heterogeneous LTE/LTE-A and 5G network in which different types of eNBs and/or mWBs provide coverage for various geographical regions. For example, each eNB, mWB, or base station 105 may provide communication coverage for a macro cell, a small cell, and/or other types of cell. The term "cell" is a 3GPP term that can be used to describe a base station, a carrier or component carrier associated with a base station, or a coverage area (e.g., sector, etc.) of a carrier or base station, depending on context. In some examples, wireless communications system 100 may be, or may include a millimeter wave communication network.

The term "NR" may be used herein to refer to "new radio," which is a way of referring to a radio interface that may be part of the 5G communication methodology. The term "NR" may be used interchangeably with the term "5G."

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

Wireless communications system 100 may support synchronous or asynchronous operation. For synchronous operation, base stations 105 may have similar frame timing, and transmissions from different base stations may be approximately aligned in time. For asynchronous operation, base stations 105 may have different frame timing, and transmissions from different base stations may not be aligned in time.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARQ) to provide retransmission at the MAC layer to improve link efficiency. In the control plane, the Radio Resource Control (RRC) protocol layer may provide establishment, configuration, and maintenance of an RRC connection between a UE 115 and the base stations 105 or core network 130 supporting radio bearers for the user plane data. At the Physical (PHY) layer, the transport channels may be mapped to Physical channels.

The UEs 115 are dispersed throughout the wireless communications system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE 115 may be able to communicate with various types of base stations and network equipment including macro eNBs, small cell eNBs, mWBs, relay base stations, and the like. A UE 115 may also be able to communicate with other UEs either within or outside the same coverage area of a base station via D2D communications.

The communication links 125 shown in wireless communications system 100 may carry or represent uplink (UL) transmissions from a UE 115 to a base station 105, and/or downlink (DL) transmissions from a base station 105 to a UE 115. The downlink transmissions may also be called forward link transmissions while the uplink transmissions may also be called reverse link transmissions. Each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using FDD (e.g., using paired spectrum resources) or TDD operation (e.g., using unpaired spectrum resources). Frame structures for FDD (e.g., frame structure type 1) and TDD (e.g., frame structure type 2) may be defined.

In some examples, base stations 105 and/or UEs 115 may include multiple antennas for employing antenna diversity schemes to improve communication quality and reliability between base stations 105 and UEs 115. Additionally or alternatively, base stations 105 and/or UEs 115 may employ multiple-input, multiple-output (MIMO) techniques that may take advantage of multi-path environments to transmit multiple spatial layers carrying the same or different coded data.

The modulation and multiple access scheme employed by UEs 115 and base stations 105 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO), Ultra Mobile Broadband (UMB), 5G, or other modulation and multiple access techniques. EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (Wi-MAX), 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

Coding methods set forth in this disclosure may be employed in association with transmitting or receiving communications such as, for example, control channel communications. Control channels may include channels through which a UE 115 may transmit uplink transmissions to a base station 105, such as, for example, a physical uplink control channel (PUCCH). As known to one of ordinary skill in the art, the PUCCH may be used for HARQ signaling, MIMO feedback, scheduling requests for uplink transmissions, or other tasks. Control channels may also include channels through which a base station 105 may transmit downlink transmissions to a UE 115, such as, for example, a physical downlink control channel (PDCCH). As known to one of ordinary skill in the art, the PDCCH may be used for HARQ signaling, to inform the UE 115 about resource allocations of various channels, or other tasks. Control channel communications serve only as an example of a type or class of communications in association with which coding methods set forth in this disclosure may be employed, and others will readily occur to one of ordinary skill in the art in view of this disclosure.

Figure 2:
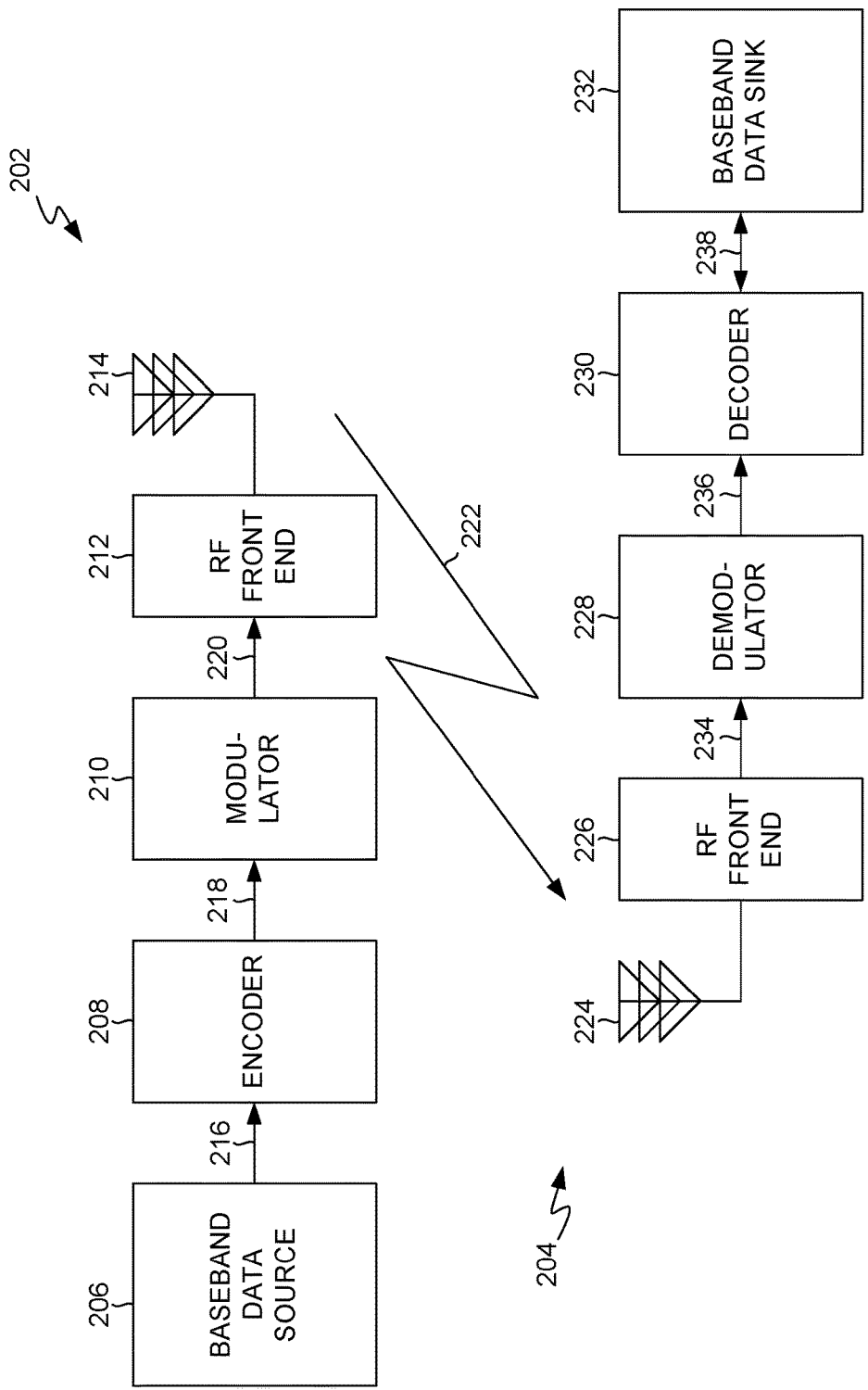
FIG. 2 is a block diagram illustrating an example of a system comprising a transmitter and a receiver, in accordance with various aspects of the present disclosure.

FIG. 2 is a block diagram of transmitter portion 202 and a receiver portion 204 of a communication system. Transmitter portion 202 may include a baseband data source 206, an encoder 208, a modulator 210, a radio frequency (RF) front end 212, and an antenna system 214. Baseband data source 206 provides information or source data 216 for transmission. Such source data 216 may represent voice or other audio, still or video images, text, control signals, or other information to be transmitted. Encoder 208 encodes source data 216 using polar encoding in a manner described below. As conventional polar coding is well understood by one of ordinary skill in the art, details of conventional polar coding systems and methods are not provided in this disclosure. Encoder 208 outputs encoded data 218. Modulator 210 modulates encoded data 218. RF front end 212 upconverts the modulated signal 220 provided by modulator 210 to radio frequencies and provides such RF signals to antenna system 214. The RF signals may be transmitted through antenna system 214 via a communication channel 222. Receiver portion 204 includes another antenna system 224, which may receive the transmitted RF signals via channel 222. Receiver portion 204 may also include an RF front end 226, a demodulator 228, a decoder 230, and a baseband data sink 232. RF front end 226 may downconvert the received RF signals to baseband frequency signals 234. Demodulator 228 may demodulate baseband frequency signals 234. Demodulator 228 provides the resulting demodulated input data 236 to decoder 230. Decoder 230 decodes input data 236 using polar decoding in a manner described below. The polar decoding may include SCL decoding or CA-SCL decoding. As conventional SCL and CA-SCL decoding are well understood by one of ordinary skill in the art, details of such conventional SCL and CA-SCL systems and methods are not provided in this disclosure. Decoder 230 outputs decoded data 238, which baseband data sink 232 may further process in a conventional manner. Except as set forth in this disclosure, the foregoing elements of transmitter portion 202 and receiver portion 204 may have conventional structures and functions. Accordingly, such structures and functions are not described in this disclosure. Also, it should be understood that although only a single signal flow path through transmitter portion 202 and receiver portion 204 is shown in FIG. 2 for purposes of clarity, there may be multiple signal flow paths. For example, although only a single encoder 208 is shown and a single decoder 230 is shown, there may be multiple instances of such encoders and decoders. In addition, or alternatively, a single encoder 208 or a single decoder 230 may have multiple portions or otherwise be configured to encode and decode multiple signal paths or channels, respectively. For example, one such encoder and decoder pair or portions thereof may be configured to encode and decode user data (e.g., voice or other audio, still or video images, text, etc.) while another encoder and decoder pair or portions thereof may be configured to encode and decode control signals, such as, for example, the above-described uplink and downlink control channels. Also, although in the exemplary embodiment illustrated in FIG. 2 transmitter portion 202 and receiver portion 204 may communicate with each other via communication channel 222, in other embodiments such a transmitter portion and receiver portion may be integrated together as a transceiver. For example, each of UEs 115 (FIG. 1) may include transmitter portion 202 and receiver portion 204.

Figure 3:
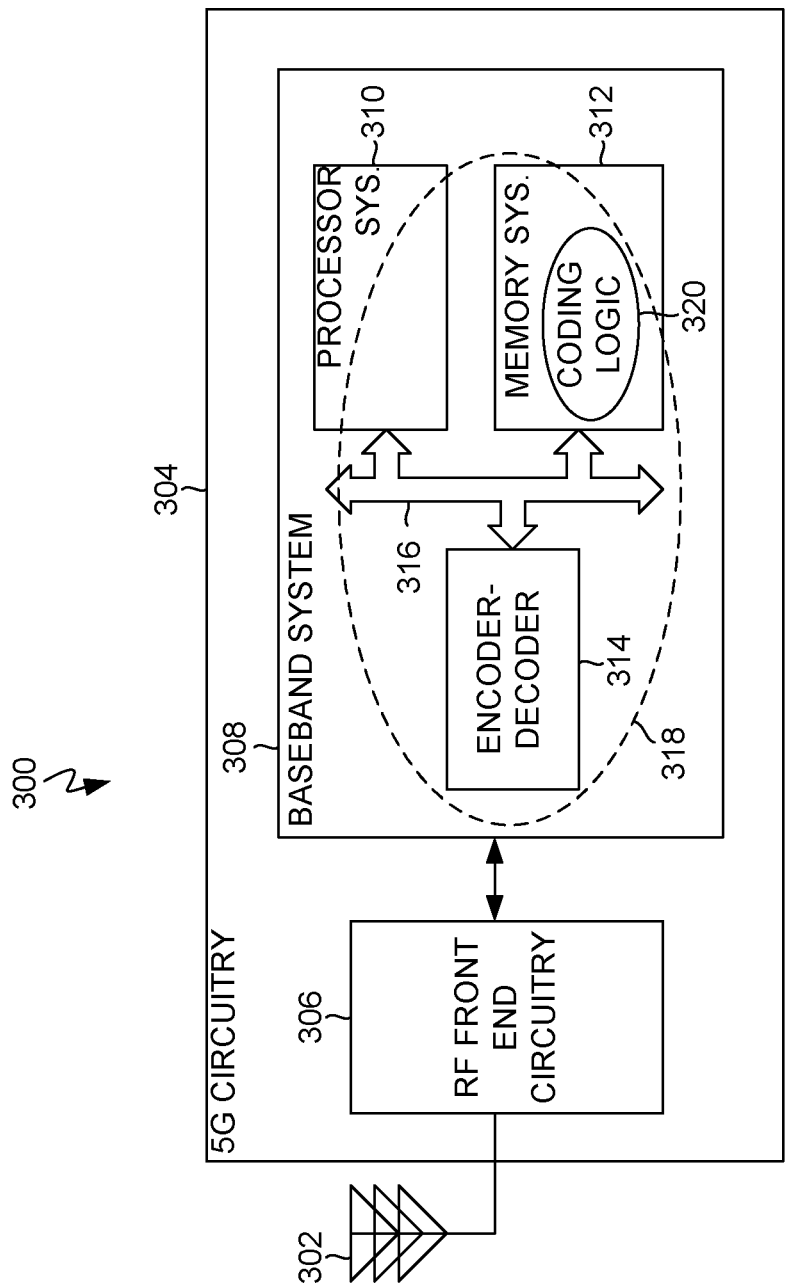
FIG. 3 is a block diagram illustrating an example of a transceiver, in accordance with various aspects of the present disclosure.

FIG. 3 is a block diagram of a UE 300, in accordance with various aspects of the present disclosure. The UE 300 may be an example of one or more aspects of LIE 115 (FIG. 1) or an example of one or more aspects of transmitter portion 202 and receiver portion 204 (FIG. 2). The UE 300 may include one or more antennas 302 and 5G circuitry 304. The 5G circuitry 304 may include RF front end circuitry 306 and baseband system circuitry 308. Baseband system circuitry 308 may include a processor system 310, a memory system 312, and encoder-decoder components 314, each of which may communicate, directly or indirectly, with each other (e.g., via one or more buses 316). A channel coding system 318 may include some or all of encoder-decoder components 314, processor system 310, and memory system 312. As described in further detail below, under control of processor system 310, channel coding system 318 is configured to encode source data for transmission via RF front end circuitry 306 and antennas 302, and decode input data received via antennas 302 and RF front end circuitry 306. A portion of such encoding and decoding or other channel coding functionality may be performed under the control of processor system 310 through the execution of logic or instructions in the form of software, firmware, etc. In addition, some or all of the coding and related communication methods described in this disclosure may be performed under the control of processor system 310 through the execution of coding logic 320. In the example shown in FIG. 3, memory system 310 is configured with, among other things, coding logic 320. In this example, coding logic 320 may be in the form of software or firmware. More generally, memory system 312 or other memory (not shown) may be configured with software or firmware, which, when executed by processor system 310 or other processors (not shown), causes UE 300 to control various methods, including the methods described in this disclosure. Although for purposes of clarity coding logic 320 is shown in FIG. 3 in a conceptual manner as stored in or residing in memory system 312 in the manner of software or firmware, it should be understood that coding logic 320 may be made accessible to processor system 310 in any manner. In addition to coding logic 320, additional logic, including logic that causes UE 300 to control conventional methods commonly associated with UE communications or other UE operation, may be included but is not shown in FIG. 3 for purposes of clarity. Also, it should be noted that memory system 312 is an example of a computer program product comprising a non-transitory computer-readable medium having stored therein in non-transitory computer-executable form, instructions (e.g., coding logic 320) which, when executed by processor system 310, may effect the methods of operation described in this disclosure. Some or all of baseband system 308 and RF front end circuitry 306 may be implemented using one or more application-specific integrated circuits (ASICs) adapted to control some or all of the associated methods or functions described herein. Alternatively, the methods or functions may be controlled by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art.

Figure 4:
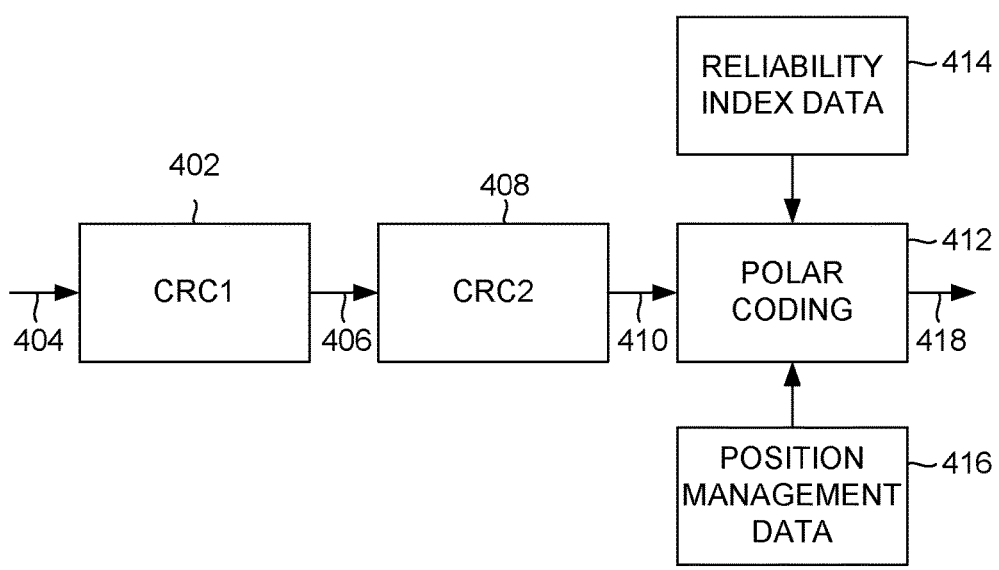
FIG. 4 is a system flow diagram illustrating polar encoding using two concatenated CRC values, in accordance with various aspects of the present disclosure.

FIG. 4 conceptually illustrates a system relating to: calculating or otherwise determining first cyclic redundancy check data (CRC1) 402 from source data 404; concatenating or otherwise combining source data 404 with CRC1 402 to form first combined data 406; determining second cyclic redundancy check data (CRC2) 408 from first combined data 406; combining source data 404, CRC1 402, and CRC2 408 to form second combined data 410; and applying polar coding 412 to second combined data 410 using reliability index data 414 and position management data 416 to form output data 418.

Figure 5A:
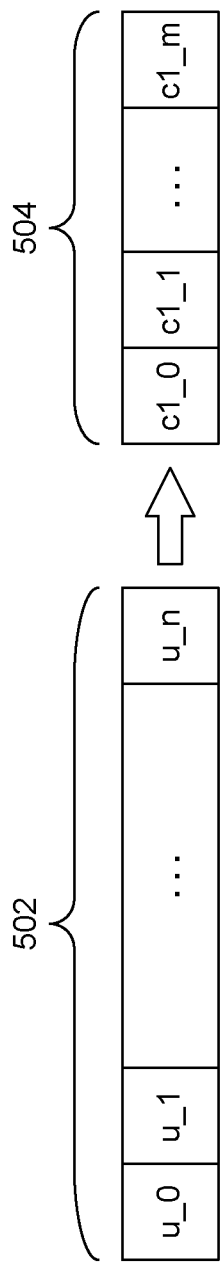
FIG. 5A is a data diagram illustrating calculation of first CRC data (CRC1) based on source data, in accordance with various aspects of the present disclosure.
Figure 5B:
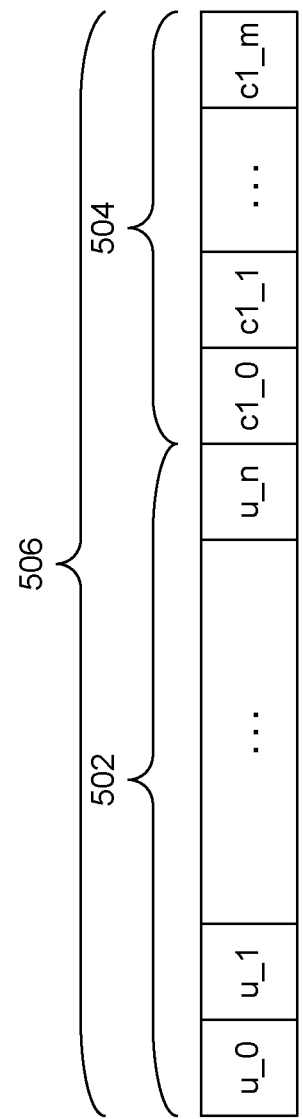
FIG. 5B is a data diagram illustrating concatenation of the source data and the CRC1 of FIG. 5A.

FIGS. 5A-5B illustrate source data 502, which may be an example of source data 404 (FIG. 4) or source data 216 (FIG. 2). Source data 502 comprises multiple information bits u_0 through u_n, with bits between the first bit u_0 and last bit u_n that are not shown for purposes of clarity being indicated by an ellipsis (" . . . ") symbol. Source data may consist of any integer number (n+1) of bits. A CRC1 504 may be calculated or otherwise determined from source data 502 in a conventional manner, as well understood by one of ordinary skill in the art. CRC1 504 comprises multiple bits c1_0 through c1_$m$, with bits between the first bit c1_0 and last bit c1_$m$ that are not shown for purposes of clarity being indicated by an ellipsis (" . . . ") symbol. CRC1 504 may consist of any integer number (m+1) of bits. As illustrated in FIG. 5B, CRC1 504 is concatenated to or otherwise combined with source data 502 to form first combined data 506.

Figure 6:
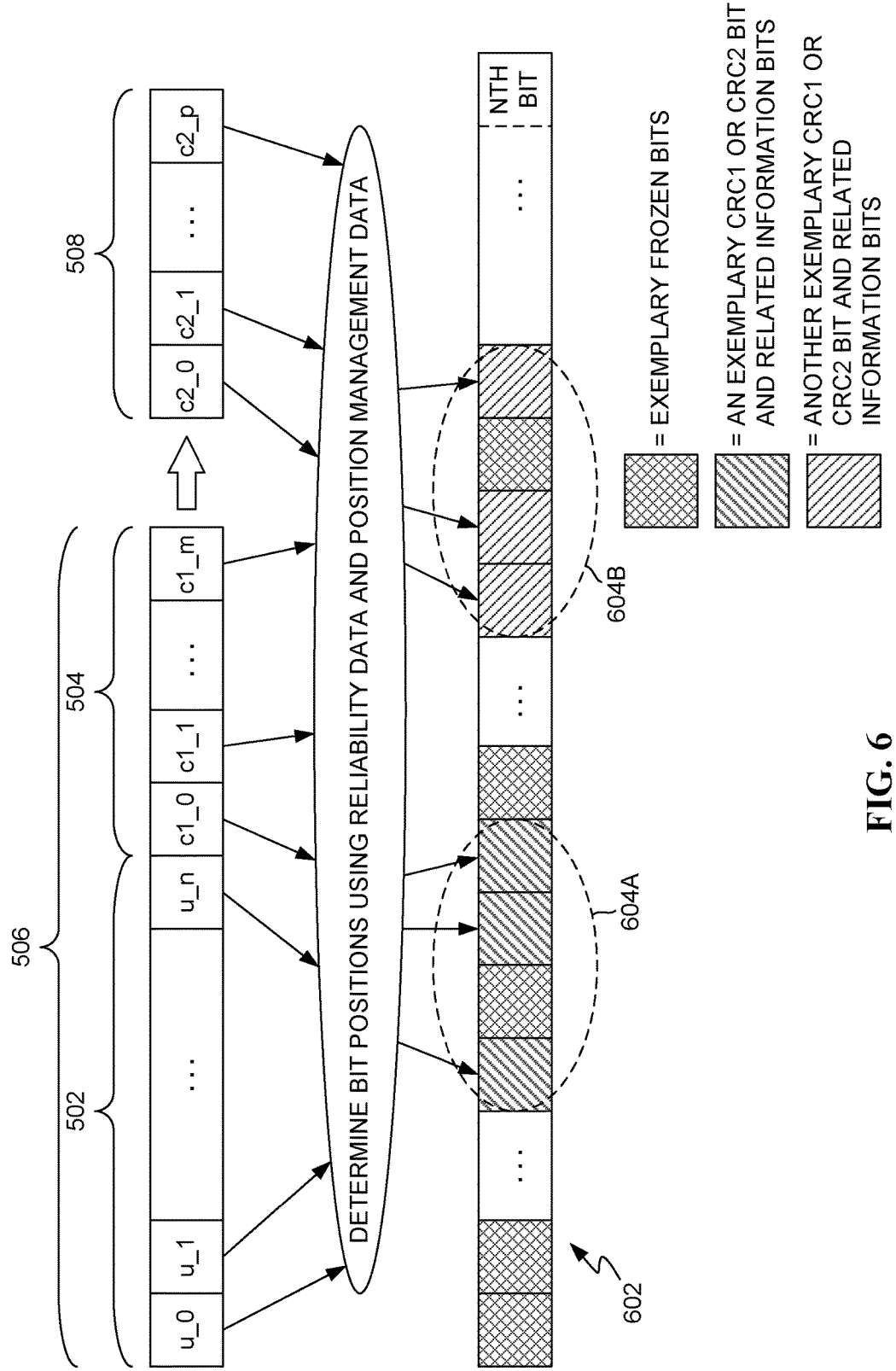
FIG. 6 is a data diagram illustrating an example of calculation of second CRC data (CRC2) based on the source data and concatenated CRC1, and allocation of bit positions for the source data, CRC1, CRC2, and frozen bits, in accordance with various aspects of the present disclosure.

FIG. 6 illustrates calculating or otherwise determining second CRC data (CRC2) 508 from the first combined data 506. CRC2 may be calculated or otherwise determined in a conventional manner, as well understood by one of ordinary skill in the art. CRC2 508 comprises multiple bits c2_0 through c2_$p$, with bits between the first bit c2_0 and last bit c2_$p$ that are not shown for purposes of clarity being indicated by an ellipsis (" . . . ") symbol. CRC2 508 may consist of any integer number (p+1) of bits. Bit positions are then allocated in an output data structure 602 for the information bits of source data 502, the CRC bits (i.e., bits of CRC1 and CRC2), and frozen bits.

Output data structure 602 may be a linear array having N bit positions, i.e., ranging from a first bit position to a last or Nth bit position in decoding order. Frozen bit positions may be allocated in a conventional manner. As well understood by one of ordinary skill in the art, polar encoding determines the frozen bit positions. The remaining bit positions of output data structure 602 may be referred to as non-frozen bit positions. Referring briefly to FIG. 4, reliability index data 414 may identify the frozen bit positions. Reliability index data 414 may be determined using a polar code generator (not shown) before the communication methods set forth in this disclosure are performed, and embodied in a data file (e.g., included in coding logic 320 (FIG. 3) or other data storage structure), thereby simplifying the remaining steps of polar coding that occur during communication. The reliability index data 414 may relate each bit position to reliability of a corresponding sub-channel. The information bit positions for source data 502 and CRC bit positions for CRC1 504 and CRC2 508 may be allocated to the K most reliable bit positions, i.e., the non-frozen bit positions, in output data structure 602. Frozen bit positions are allocated to the remaining N-K bit positions in output data structure 602. Frozen bit positions in output data structure 602 are set to a predetermined value, such as 0 or 1, in accordance with conventional polar encoding methods. Among the K non-frozen bit positions, information bit positions for source data 502 and CRC bit positions for CRC1 504 and CRC2 508 are allocated in output data structure 602 using position management data 416 (FIG. 4). Position management data 416 positions bits of CRC2 508 with related information bits in positions that enable corresponding parity checking for them to be performed as early as possible.

FIG. 6 illustrates an allocation example, in which information bit positions for source data 502 and CRC bit positions for CRC1 504 and CRC2 508 are allocated by using position management data 416 to identify at least one cluster 604A, 604B, etc., of non-frozen bit positions within output data structure 602. In such a cluster 604A, 604B, etc., the bit positions are sorted in decoding order. That is, the CRC2 bits are as close as possible to corresponding information bits and CRC1 bits that the CRC2 bits encode. Clustering information bit positions for source data 502 and CRC bit positions for CRC1 504 and CRC2 508 in this manner may provide advantages such as, for example, facilitating a bit-by-bit CRC parity check during decoding as early in the decoding process as possible. In contrast, in conventional CA-SCL decoding, CRC checking is always performed after all information bits are completely decoded. Early parity checking, as described in this disclosure, can improve decoding performance by enabling early pruning of a candidate path. Alternatively, the early parity checking can enable early decoding termination to save power. After allocating information bit positions, the information bits of source data 502 may be copied into the correspondingly allocated bit positions in output data structure 602. Similarly, after allocating CRC bit positions, the bits of CRC1 504 and CRC2 508 may be copied into the correspondingly allocated bit positions in output data structure 602. The resulting bits as stored in output data structure 602 define a codeword. The codeword may be further processed and transmitted in the manner described above with regard to FIGS. 1-3. Position management data 416 may be embodied in a data file (e.g., included in coding logic 320 (FIG. 3) or other data storage structure.

Figure 7:
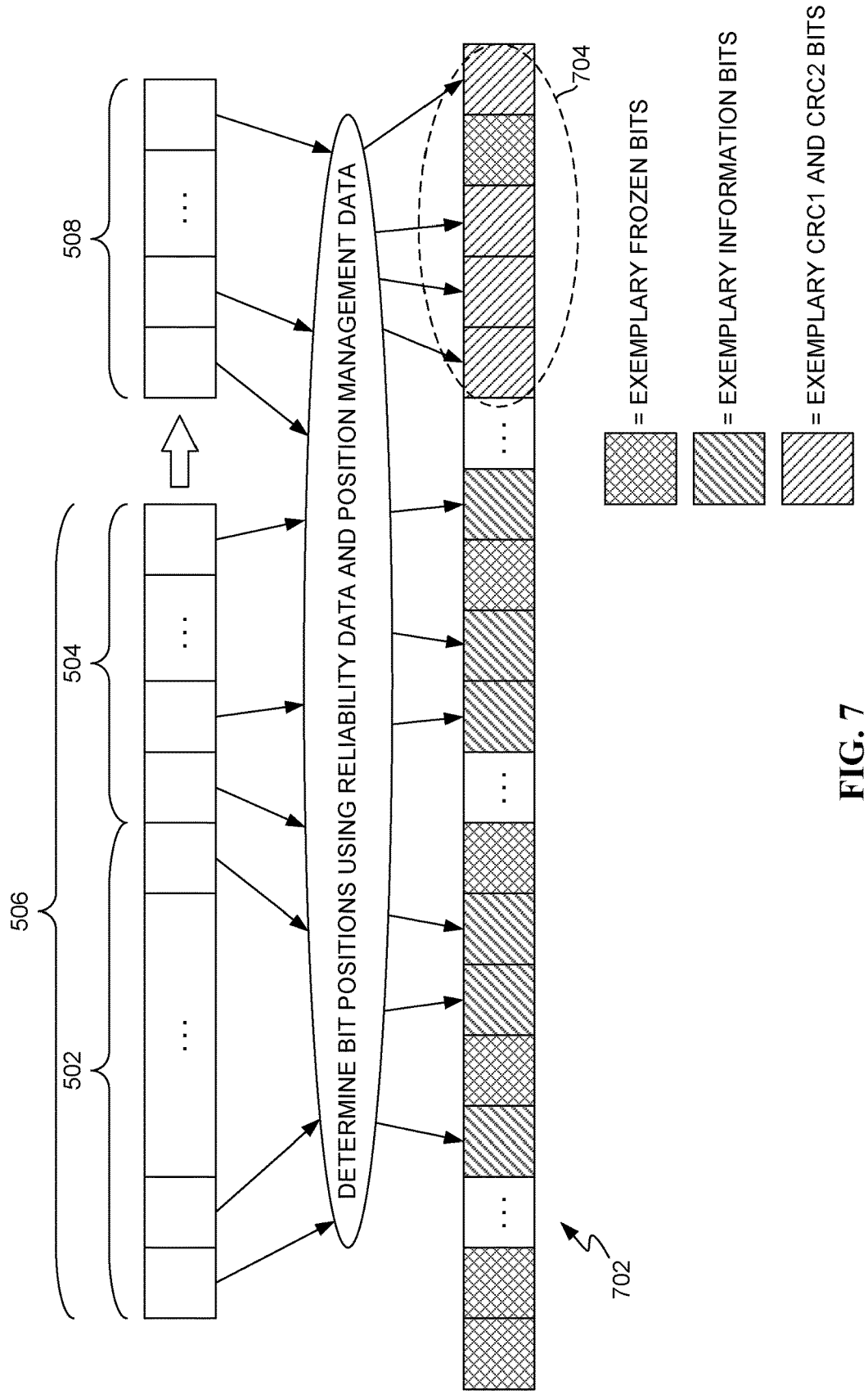
FIG. 7 is a data diagram illustrating another example of calculation of CRC2 data based on the source data and concatenated CRC1, and another example of allocation of bit positions for the source data, CRC1, CRC2, and frozen bits, in accordance with various aspects of the present disclosure.

FIG. 7 illustrates another allocation example, in which CRC bit positions for CRC1 504 and CRC2 508 are allocated by using position management data 416 to identify a cluster 704 of non-frozen bit positions at a tail of an output data structure 702. That is, all bits of CRC1 504 and CRC2 508 are allocated to non-frozen bit positions nearest the Nth bit position. In this example, information bit positions for source data 502 may be allocated to any other non-frozen bit positions in output data structure 702.

Figure 8:
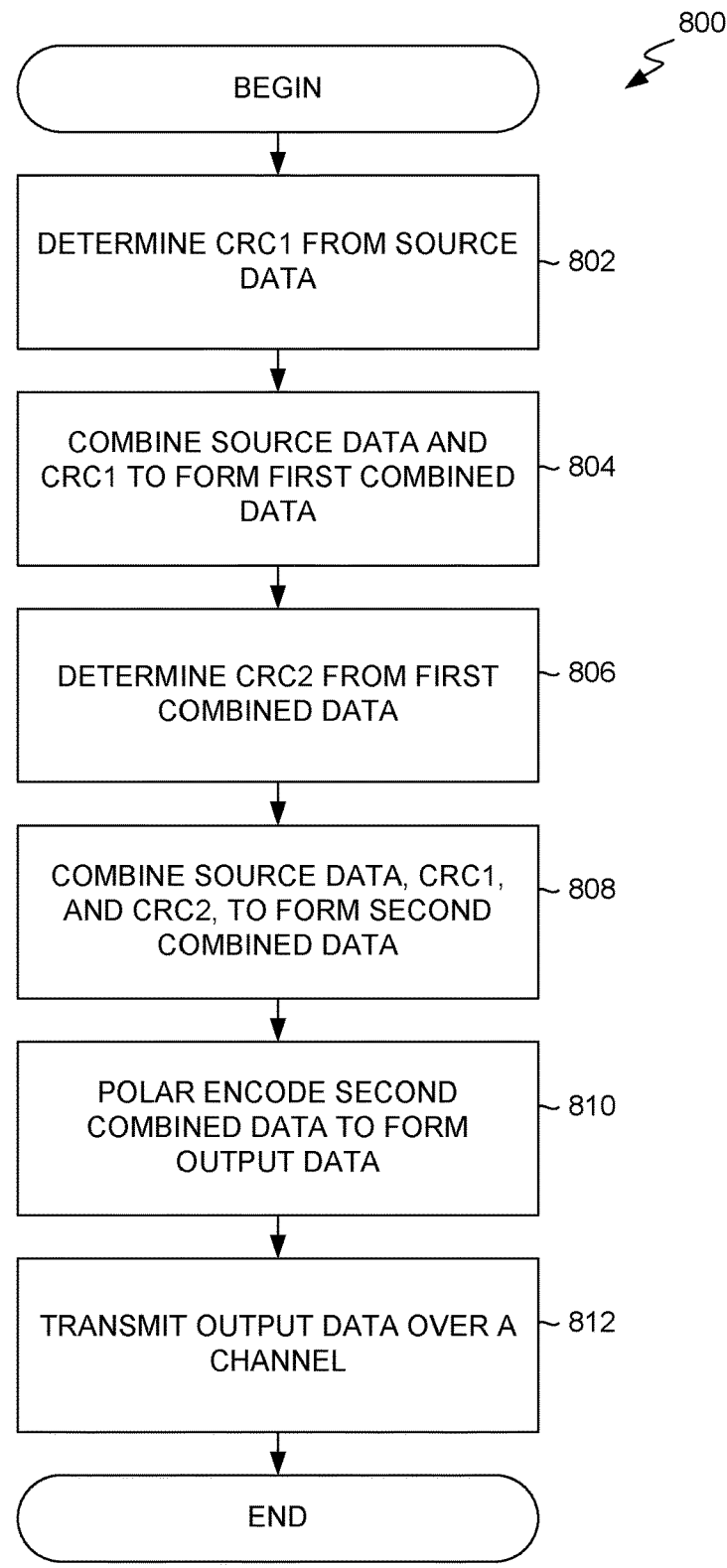
FIG. 8 is a method flow diagram illustrating an example of a method for communication, in accordance with various aspects of the present disclosure.

FIG. 8 illustrates an exemplary method 800 for communication. For example, method 800 may operate in accordance with one or more of the examples described above with regard to FIGS. 4-7. As indicated by block 802, CRC1 is determined from source data. As indicated by block 804, the source data and CRC1 are concatenated or otherwise combined to form first combined data. As indicated by block 806, CRC2 is determined from the first combined data. As indicated by block 808, the source data and (e.g., concatenated) CRC1, are combined with (e.g., by further concatenating) CRC2 to form second combined data. As indicated by block 810, the second combined data is polar encoded to form output data. As indicated by block 812, the output data may be transmitted over a channel, such as communication channel 222 (FIG. 2).

Figure 9:
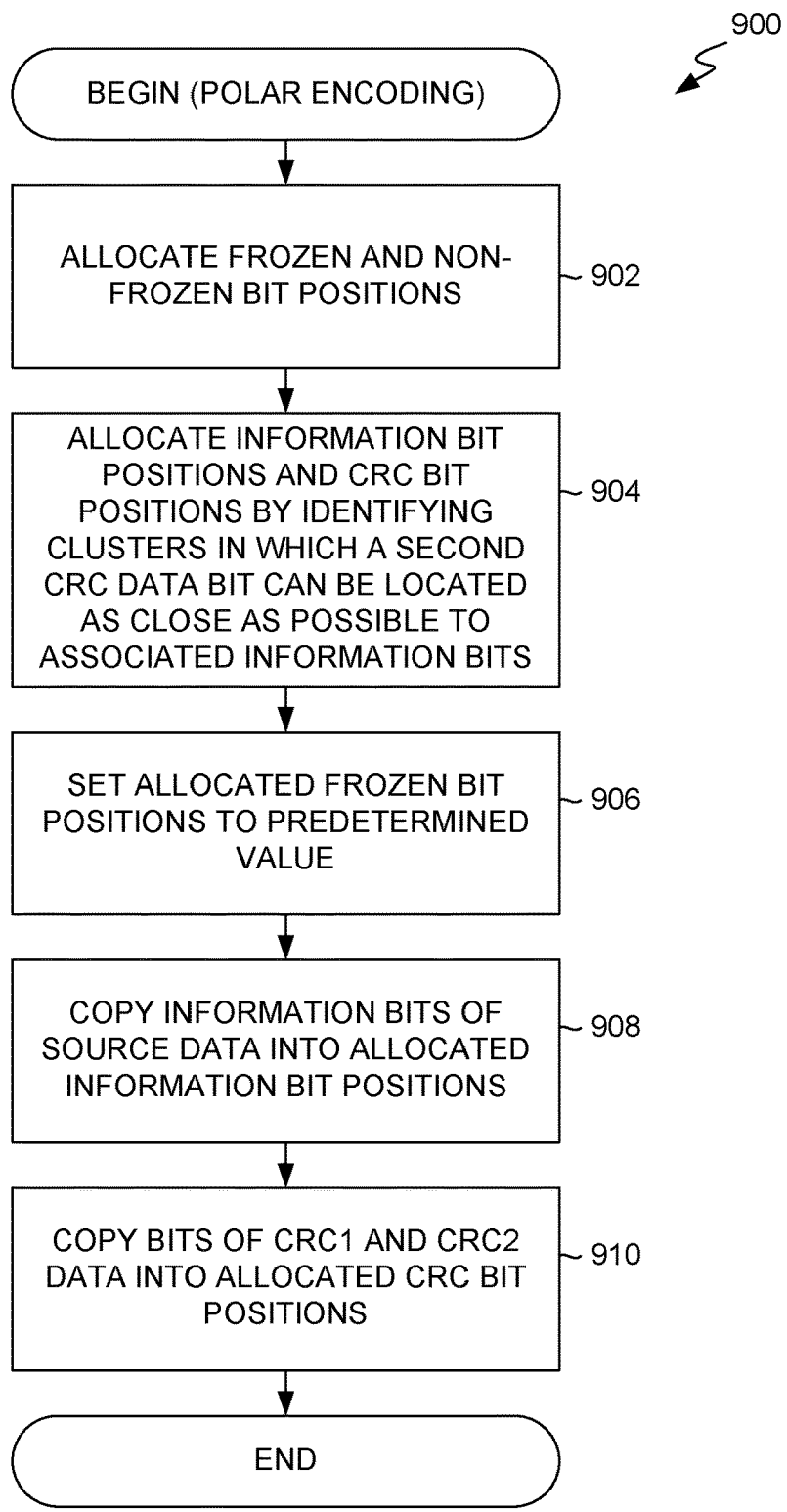
FIG. 9 is a method flow diagram illustrating an example of a polar encoding portion of the method illustrated in FIG. 8.

FIG. 9 illustrates an exemplary method 900 representing an example of the polar encoding described above with regard to block 810 of FIG. 8. For example, method 900 may operate in accordance with the example described above with regard to FIG. 6. As indicated by block 902, frozen and non-frozen bit positions in an output data structure are allocated. As indicated by block 904, information bit positions and CRC bit positions are allocated by using the position management data to identify a cluster of non-frozen bit positions within the output data structure for each CRC2 bit position with the corresponding information bit positions and CRC1 bit positions. The information bit positions and CRC1 bit positions of the cluster are as close as possible to the position of a CRC2 bit. As indicated by block 906, the allocated frozen bit positions in the output data structure are set to a predetermined value, such as 0 or 1. As indicated by block 908, information bits of the source data are copied into allocated information bit positions (in the clusters) in the output data structure. As indicated by block 910, the CRC1 and CRC2 bits are copied into the allocated CRC bit positions (in the clusters) in the output data structure.

Figure 10:
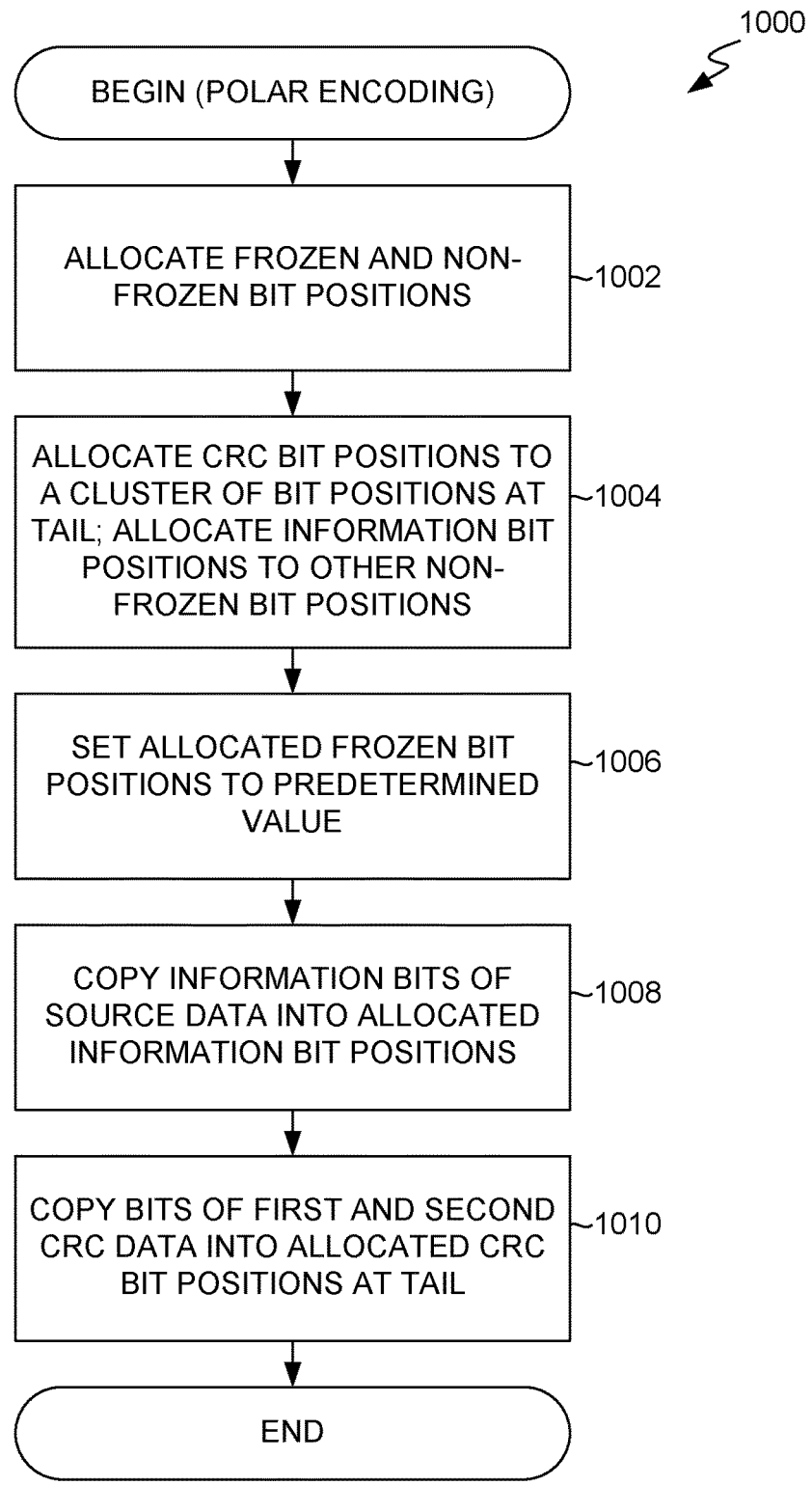
FIG. 10 is a method flow diagram illustrating another example of a polar encoding portion of the method illustrated in FIG. 8.

FIG. 10 illustrates an exemplary method 1000 representing another example of the polar encoding described above with regard to block 810 of FIG. 8. For example, method 1000 may operate in accordance with the example described above with regard to FIG. 7. As indicated by block 1002, frozen and non-frozen bit positions in an output data structure are allocated. As indicated by block 1004, CRC bit positions are allocated in a cluster at the tail of the data structure, and information bit positions are allocated to other non-frozen bit positions within the output data structure. As indicated by block 1006, the allocated frozen bit positions in the output data structure are set to a predetermined value, such as 0 or 1. As indicated by block 1008, information bits of the source data are copied into allocated information bit positions in the output data structure. As indicated by block 1010, the CRC1 and CRC2 bits are copied into the allocated CRC bit positions in the cluster at the tail of the output data structure.

Figure 11:
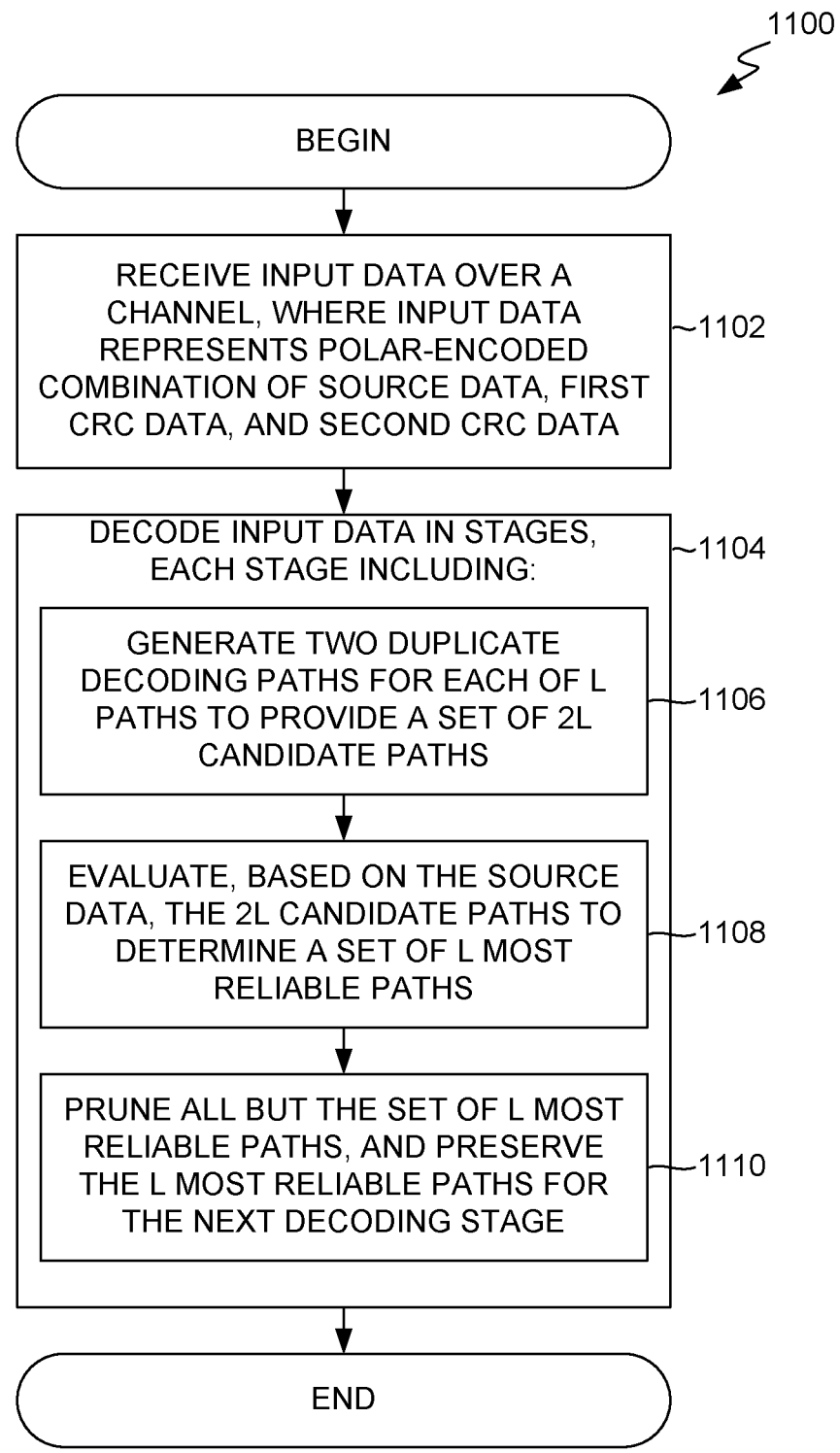
FIG. 11 is a method flow diagram illustrating another example of a method for communication, in accordance with various aspects of the present disclosure.

FIG. 11 illustrates an exemplary method 1100 for communication. Method 1100 may relate to decoding received data, such as (encoded) input data 236 (FIG. 2). The input data may be received over a channel, such as communication channel 222 (FIG. 2). As indicated by block 1102, the received input data may be encoded as described above with regard to FIGS. 5A-10. Accordingly, the input data may represent a polar-encoded combination of source data, CRC1, and CRC2. As indicated by block 1104, the input data may be decoded in stages. Except as set forth in this disclosure, the input data may be decoded in accordance with conventional CA-SCL principles, which are well known to one of ordinary skill in the art.

Although CA-SCL decoding is well known, it may be useful to the following description to note certain prominent principles. For example, the information bits are successively decoded in a recursive manner. Referring briefly to source data 502 in FIGS. 5A-5B and FIGS. 6-7, the first information bit u_1 is analyzed at a first stage of the method by generating and analyzing two candidate paths: a first path in which it may be decided that the first information bit u_1 has a value of 0 and a second path in which it may be decided that u_1 has a value of 1. For each of those paths relating to u_1, two additional candidate paths are generated and analyzed: a first path in which it may be decided that the next information bit u_2 has a value of 0 and a second path in which it may be decided that u_2 has a value of 1. In this manner, a tree is generated and analyzed. That is, the data structures (not shown) representing a parent decoding path are duplicated at each stage, and one of the duplicates (copies) of the parent decoding path is appended to each of the two branches that represent the two decision possibilities.

Thus, as indicated by block 1106, the decoding (block 1104) may include, at each stage, generating two duplicate decoding paths for each of L paths, to provide a set of 2 L candidate paths, where L represents a list size. As indicated by block 1108, the decoding (block 1104) may also include evaluating, based on the source data, the 2 L candidate paths to determine a set of L most reliable paths. Some or all aspects of blocks 1106, 1108, and 1110 may be conventional. As indicated by block 1110, the decoding (block 1104) may further include removing or pruning from the list all but the set of L most reliable path, and preserving the L most reliable paths for analysis in the next decoding stage. For purposes of clarity, the use of CRC1 and CRC2 is not explicitly described above with regard to the exemplary decoding (block 1104). However, it is understood by one of ordinary skill in the art that in conventional CA-SCL decoding, CRC data may be used to remove or prune from the list all paths that do not pass a CRC parity check before following the most likely, i.e., reliable, path based on the source data.

Figure 12:
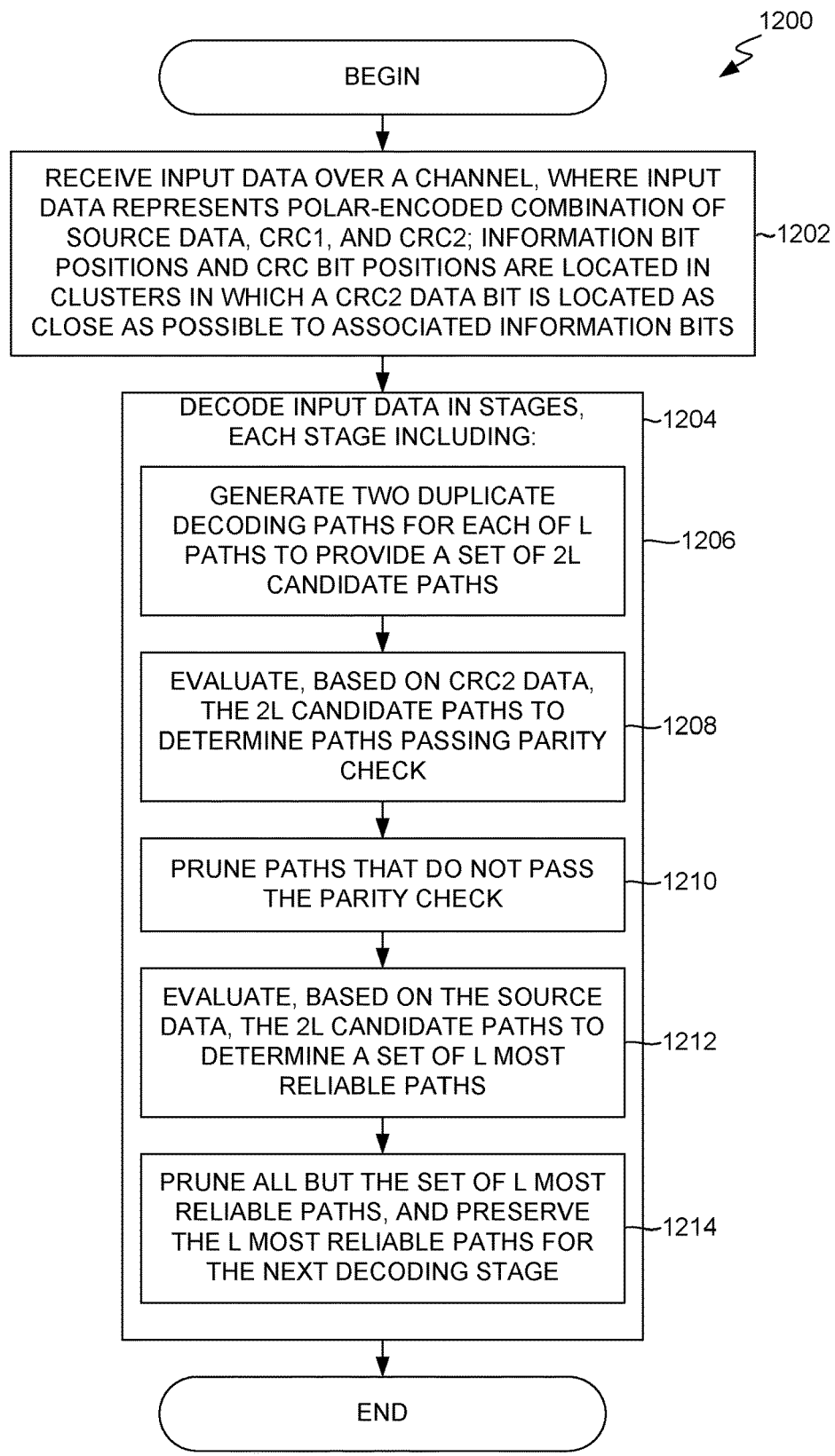
FIG. 12 is a method flow diagram illustrating an example of using CRC2 for early pruning in the method illustrated in FIG. 8.

FIG. 12 illustrates an exemplary method 1200 for communication that is similar to above-described exemplary method 1100 but includes an example of how CRC1 and CRC2 may be used to facilitate early pruning. As indicated by block 1202, the received input data may be encoded as described above. Accordingly, the input data may represent a polar-encoded combination of source data, CRC1, and CRC2. As indicated by block 1204, the input data may be decoded in stages. As indicated by block 1206, the decoding (block 1204) may include, at each stage, generating two duplicate decoding paths for each of L paths, to provide a set of 2 L candidate paths. As indicated by block 1208, the decoding (block 1204) may also include evaluating, based on CRC2, the 2 L candidate paths to determine paths passing a parity check. As indicated by block 1210, decoding (block 1204) may include removing or pruning paths that do not pass this parity check based on CRC2. As indicated by block 1212, decoding (block 1204) may include evaluating, based on the source data, the 2 L candidate paths to determine a set of L most reliable paths. The early pruning (block 1210) may enhance the efficiency of this evaluation (block 1212) by first removing paths that cannot be correct from consideration. As indicated by block 1212, the decoding (block 1204) may further include removing or pruning from the list all but the set of L most reliable path, and preserving the L most reliable paths for analysis in the next decoding stage.

Figure 13:
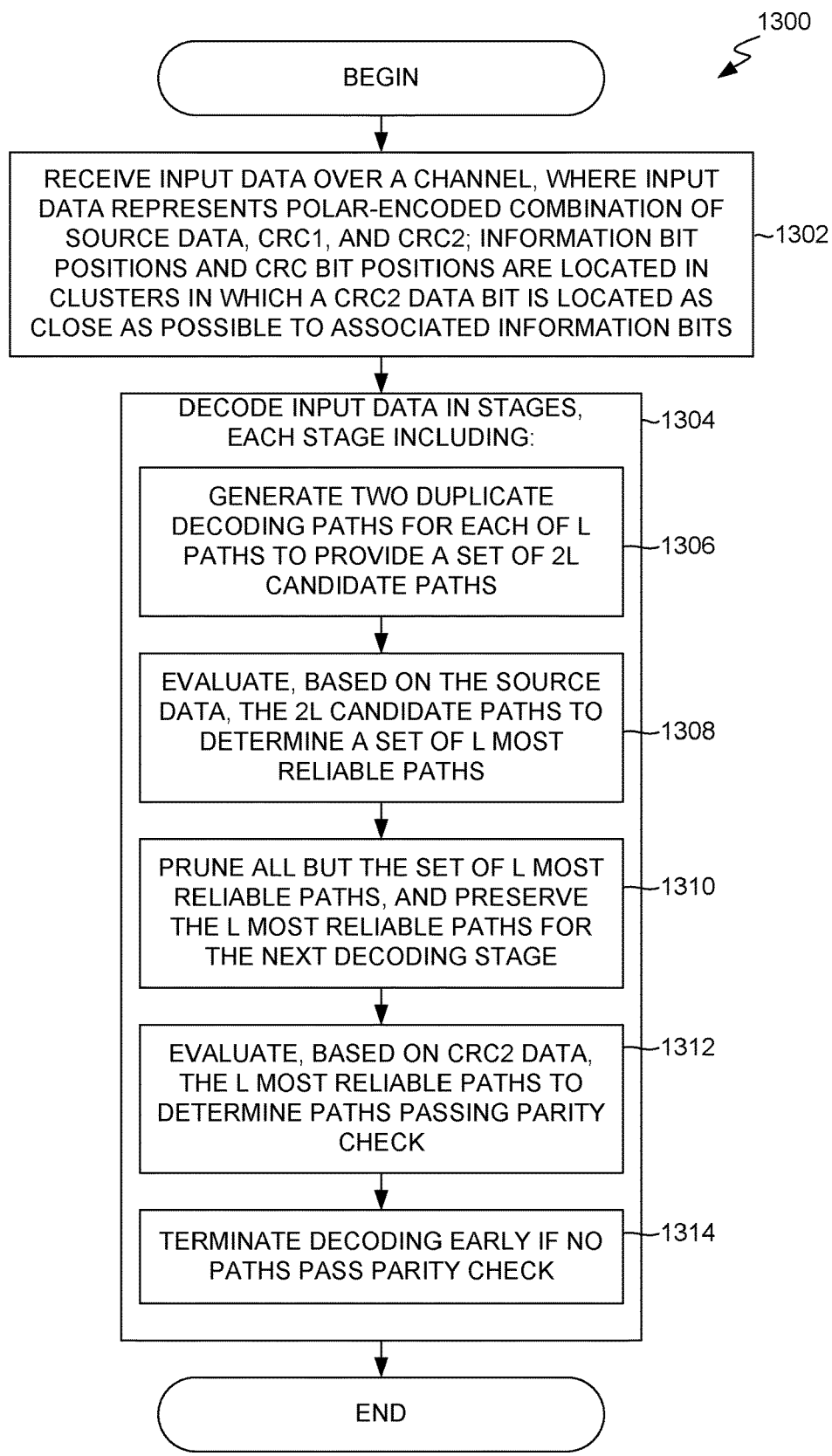
FIG. 13 is a method flow diagram illustrating an example of using CRC2 for early decoding termination in the method illustrated in FIG. 8.

FIG. 13 illustrates an exemplary method 1300 for communication that is similar to above-described exemplary method 1100 (FIG. 11) but includes an example of how CRC1 and CRC2 may be used to facilitate early decoding termination. As indicated by block 1302, the received input data may be encoded as described above. Accordingly, the input data may represent a polar-encoded combination of source data, CRC1, and CRC2. As indicated by block 1304, the input data may be decoded in stages. As indicated by block 1306, the decoding (block 1304) may include, at each stage, generating two duplicate decoding paths for each of L paths, to provide a set of 2 L candidate paths. As indicated by block 1308, decoding (block 1304) may include evaluating, based on the source data, the 2 L candidate paths to determine a set of L most reliable paths. As indicated by block 1310, the decoding (block 1304) may further include removing or pruning from the list all but the set of L most reliable path, and preserving the L most reliable paths for analysis in the next decoding stage. As indicated by block 1312, the decoding (block 1304) may also include evaluating, based on CRC2, the 2 L candidate paths remaining after pruning (block 1310) to determine paths passing a parity check. As indicated by block 1314, decoding (block 1304) may further include terminating decoding if none of the paths pass the parity check.

Figure 14:
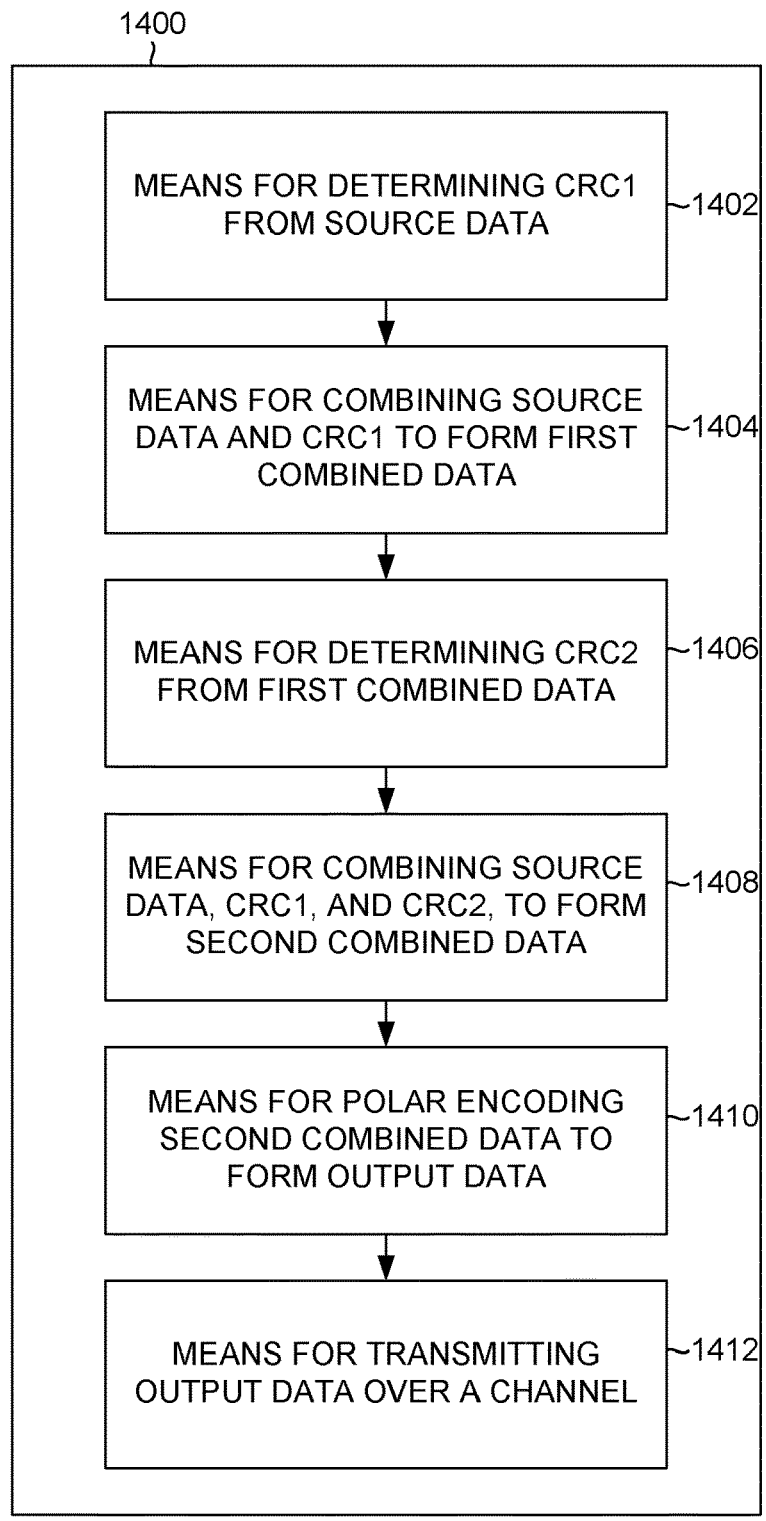
FIG. 14 is a functional block diagram illustrating a device for communication, in accordance with various aspects of the present disclosure.

FIG. 14 illustrates an apparatus 1400 for a communication system in accordance with various aspects of the present disclosure. The apparatus 1400 comprises means 1402 for determining first cyclic redundancy check (CRC) data from source data, means 1404 for combining the source data and the first CRC data to form first combined data, means 1406 for determining second cyclic redundancy check (CRC) data from the first combined data, means 1408 for combining the source data, the first CRC data, and the second CRC data to form second combined data, means 1410 for polar coding the second combined data to form output data, and means 1412 for transmitting the output data over a channel. The means 1402-1412 may be configured to perform one or more of the functions described above with regard to blocks 802-812 (FIG. 8), respectively. In exemplary embodiments, such functions may be controlled by encoder 208 (FIG. 2) or channel coding system 318 (FIG. 3).

Techniques described herein may be used in various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UT RA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project"

(3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed and/or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A; B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for communication, comprising:
   determining first cyclic redundancy check (CRC) data from source data;
   combining the source data and the first CRC data to form first combined data;
   determining second CRC data from the first combined data;
   combining the source data, the first CRC data, and the second CRC data to form second combined data;
   polar encoding the second combined data to form output data comprising one or more clusters, each cluster comprising non-frozen bit positions separated from each other by a minimal number of frozen bit positions, the non-frozen bit positions comprising second CRC data bit positions and corresponding information bit positions defining a portion of the source data; and
   transmitting the output data over a channel.

2. The method of claim 1, wherein polar encoding the second combined data comprises:
   allocating frozen and non-frozen bit positions corresponding to the second combined data using reliability index data, the reliability index data relating each bit position to reliability of a corresponding sub-channel;
   allocating, among the non-frozen bit positions, information bit positions and CRC bit positions in an output data structure using position management data;
   setting allocated frozen bit positions in an output data structure to a predetermined value;
   copying information bits of the source data into allocated information bit positions in the output data structure; and
   copying bits of the first and second CRC data into allocated CRC bit positions in the output data structure.

3. The method of claim 1, wherein transmitting the output data over a channel comprises transmitting the output data over one of a physical downlink control channel and a physical uplink control channel.

4. An apparatus for communication, comprising:
   baseband circuitry for providing source data;
   a processing system comprising a processor and memory, the processing system configured to:
   determine first cyclic redundancy check (CRC) data from source data;
   combine the source data and the first CRC data to form first combined data;
   determine second cyclic CRC data from the first combined data;

combine the source data, the first CRC data, and the second CRC data to form second combined data;

polar encode the second combined data to form output data comprising one or more clusters, each cluster comprising non-frozen bit positions separated from each other by a minimal number of frozen bit positions, the non-frozen bit positions comprising second CRC data bit positions and corresponding information bit positions defining a portion of the source data; and control transmission of the output data over a channel.

5. The apparatus of claim 4, wherein the processing system is configured to polar encode the second combined data by being configured to:

allocate frozen and non-frozen bit positions corresponding to the second combined data using reliability index data, the reliability index data relating each bit position to reliability of a corresponding sub-channel;

allocate, among the non-frozen bit positions, information bit positions and CRC bit positions in an output data structure using position management data;

set allocated frozen bit positions in an output data structure to a predetermined value;

copy information bits of the source data into allocated information bit positions in the output data structure; and copy bits of the first and second CRC data into allocated CRC bit positions in the output data structure.

6. The apparatus of claim 4, wherein the processing system is configured to control transmission of the output data over one of a physical downlink control channel and a physical uplink control channel.

7. A non-transitory computer-readable medium storing computer executable code for controlling communication, the code executable by a processor to control a method comprising:

determining first cyclic redundancy check (CRC) data from source data;

combining the source data and the first CRC data to form first combined data;

determining second CRC data from the first combined data;

combining the source data, the first CRC data, and the second CRC data to form second combined data;

polar encoding the second combined data to form output data comprising one or more clusters, each cluster comprising non-frozen bit positions separated from each other by a minimal number of frozen bit positions, the non-frozen bit positions comprising second CRC data bit positions and corresponding information bit positions defining a portion of the source data; and transmitting the output data over a channel.

8. The non-transitory computer-readable medium of claim 7, wherein polar encoding the second combined data comprises:

allocating frozen and non-frozen bit positions corresponding to the second combined data using reliability index data, the reliability index data relating each bit position to reliability of a corresponding sub-channel;

allocating, among the non-frozen bit positions, information bit positions and CRC bit positions in an output data structure using position management data;

setting allocated frozen bit positions in an output data structure to a predetermined value;

copying information bits of the source data into allocated information bit positions in the output data structure; and copying bits of the first and second CRC data into allocated CRC bit positions in the output data structure.

9. The non-transitory computer-readable medium of claim 7, wherein transmitting the output data over a channel comprises transmitting the output data over one of a physical downlink control channel and a physical uplink control channel.

10. A method for communication, comprising:

receiving input data over a channel, the input data representing a polar-encoded combination of source data, second cyclic redundancy check (CRC) data, and first CRC data, the second CRC data encoding a combination of the source data and concatenated first CRC data, the first CRC data encoding the source data, wherein in the polar-encoded combination of source data, second cyclic redundancy check (CRC) data, and first CRC data at least one cluster of non-frozen bit positions includes information bit positions and CRC bit positions, and the non-frozen bit positions of the cluster separated from each other by a minimal number of frozen bit positions; and decoding the input data using a plurality of successive decoding stages by, at each stage:

generating exactly two duplicate decoding paths for each of L paths to provide a set of 2L candidate paths, the two duplicate decoding paths representing respective decisions of 0 and 1, where L is an integer greater than 1;

evaluating, based on the source data, the set of 2L candidate paths to determine a set of L most reliable paths out of the set of 2L candidate paths;

removing from further evaluation all but the set of L most reliable paths, and preserving the set of L most reliable paths for a next decoding stage;

evaluating, based on the second CRC data, the set of L most reliable paths to determine a subset of paths passing a parity check;

terminating decoding if the subset of paths passing a parity check is empty; and continuing decoding with the next decoding stage if the subset of paths passing the parity check is not empty.

11. The method of claim 10, wherein decoding the input data using a plurality of successive decoding stages further comprises, before the step of evaluating based on the source data:

evaluating, based on the second CRC data, the set of 2L candidate paths to determine a subset of paths passing a parity check; and removing from further evaluation all but the subset of paths passing the parity check, and preserving the subset of paths passing the parity check for further evaluation.

12. The method of claim 10, wherein receiving input data over a channel comprises receiving the input data over one of a physical downlink control channel and a physical uplink control channel.

13. An apparatus for communication, comprising:

a processing system comprising a processor and memory, the processing system configured to:

control reception of input data over a channel, the input data representing a polar-encoded combination of source data, second cyclic redundancy check (CRC) data, and first CRC data, the second CRC data encoding a combination of the source data and concatenated first CRC data, the first CRC data encoding the source data, wherein in the polar-encoded combination of source data, second cyclic redundancy check (CRC) data, and first CRC data at least one cluster of non-frozen bit positions includes information bit positions and CRC bit positions, and the non-frozen bit positions of the cluster separated from each other by a minimal number of frozen bit positions; and decode the input data using a plurality of successive decoding stages by the processing system being configured to, at each stage:

generate exactly two duplicate decoding paths for each of L paths to provide a set of 2 L candidate paths, the two duplicate decoding paths representing respective decisions of 0 and 1, where L is an integer greater than 1;

evaluate, based on the source data, the set of 2 L candidate paths to determine a set of L most reliable paths out of the set of 2 L candidate paths; and remove from further evaluation all but the set of L most reliable paths, and preserving the set of L most reliable paths for a next decoding stage, wherein decoded data remains following the plurality of successive decoding stages;

evaluate, based on the second CRC data, the set of L most reliable paths to determine a subset of paths passing a parity check;

terminate decoding if the subset of paths passing a parity check is empty; and continue decoding with the next decoding stage if the subset of paths passing the parity check is not empty; and baseband circuitry for further processing the decoded data.

14. The apparatus of claim 13, wherein the processing system is configured to decode the input data by being configured to, before the subset of the 2 L candidate paths passing the parity check is evaluated:

evaluate, based on the second CRC data, the set of 2 L candidate paths to determine a subset of paths passing a parity check; and remove from further evaluation all but the subset of paths passing the parity check, and preserving the subset of paths passing the parity check for further evaluation.

15. The apparatus of claim 13, wherein the processing system is configured to control reception of the input data over one of a physical downlink control channel and a physical uplink control channel.

16. A non-transitory computer-readable medium storing computer executable code for controlling communication, the code executable by a processor to control a method comprising:

receiving input data over a channel, the input data representing a polar-encoded combination of source data, second cyclic redundancy check (CRC) data, and first CRC data, the second CRC data encoding a combination of the source data and concatenated first CRC data, the first CRC data encoding the source data, wherein in the polar-encoded combination of source data, second cyclic redundancy check (CRC) data, and first CRC data at least one cluster of non-frozen bit positions includes information bit positions and CRC bit positions, and the non-frozen bit positions of the cluster separated from each other by a minimal number of frozen bit positions; and decoding the input data using a plurality of successive decoding stages by, at each stage:

generating exactly two duplicate decoding paths for each of L paths to provide a set of 2 L candidate paths, the two duplicate decoding paths representing respective decisions of 0 and 1, where L is an integer greater than 1;

evaluating, based on the source data, the set of 2 L candidate paths to determine a set of L most reliable paths out of the set of 2 L candidate paths; and removing from further evaluation all but the set of L most reliable paths, and preserving the set of L most reliable paths for a next decoding stage;

evaluating, based on the second CRC data, the set of L most reliable paths to determine a subset of paths passing a parity check;

terminating decoding if the subset of paths passing a parity check is empty; and continuing decoding with the next decoding stage if the subset of paths passing the parity check is not empty.

17. The non-transitory computer-readable medium of claim 16, wherein decoding the input data using a plurality of successive decoding stages further comprises, before the step of evaluating based on the source data:

evaluating, based on the second CRC data, the set of 2 L candidate paths to determine a subset of paths passing a parity check; and removing from further evaluation all but the subset of paths passing the parity check, and preserving the subset of paths passing the parity check for further evaluation.

18. The non-transitory computer-readable medium of claim 16, wherein receiving input data over a channel comprises receiving the input data over one of a physical downlink control channel and a physical uplink control channel.

* * * * *